(12) United States Patent
White

(10) Patent No.: US 8,061,670 B1  
(45) Date of Patent: Nov. 22, 2011

(54) CUP HOLDER ADAPTER FOR MOUNTING PORTABLE ELECTRONIC DEVICES IN A VEHICLE CONSOLE

(76) Inventor: James E. White, Houston, TX (US)

(*) Notice: Subject to any disclaimer, the term of this patent is extended or adjusted under 35 U.S.C. 154(b) by 252 days.

(21) Appl. No.: 12/229,153

(22) Filed: Aug. 18, 2008

Related U.S. Application Data

(60) Provisional application No. 60/965,106, filed on Aug. 17, 2007.

(51) Int. Cl.  
*A47K 1/08* (2006.01)

(52) U.S. Cl. .................. 248/311.2; 248/309.1

(58) Field of Classification Search .......... 248/311.2, 248/309.2, 183.2; D7/619  
See application file for complete search history.

(56) References Cited

U.S. PATENT DOCUMENTS

| | | | |
|---|---|---|---|
| 5,174,534 A | 12/1992 | Mitchell | |
| 5,285,953 A * | 2/1994 | Smith | 220/737 |
| 5,676,340 A | 10/1997 | Ruhnau | |
| D400,763 S * | 11/1998 | Taylor et al. | D7/619.1 |
| 5,897,041 A | 4/1999 | Ney et al. | |
| 6,019,325 A | 2/2000 | Dotson et al. | |
| 6,062,518 A | 5/2000 | Etue | |
| D439,116 S * | 3/2001 | White | D7/619.1 |
| 6,253,982 B1 * | 7/2001 | Gerardi | 224/544 |
| 6,267,340 B1 | 7/2001 | Wang | |
| 6,315,153 B1 * | 11/2001 | Osborn | 220/737 |
| 7,099,466 B2 | 8/2006 | Walsh | |
| 7,140,586 B2 | 11/2006 | Seil et al. | |
| 7,246,781 B2 * | 7/2007 | Nam | 248/516 |
| 7,708,247 B2 * | 5/2010 | Lota | 248/311.2 |
| 2002/0049081 A1 | 4/2002 | Heininger | |
| 2002/0094078 A1 | 7/2002 | Edwards | |

* cited by examiner

*Primary Examiner* — Gwendolyn Baxter  
(74) *Attorney, Agent, or Firm* — Kenneth A. Roddy

(57) ABSTRACT

A cup holder adapter for mounting portable electronic devices supported by a mounting member having a windshield or dashboard mounting base in a conventional cup holder in a vehicle. The cup holder adapter apparatus includes a generally cup-shaped cup holder adapter receptacle that fits into an existing cup holder in the vehicle, and either or both of a flat disk or generally cylindrical height adapter support member removably supported in the adapter receptacle having a flat mounting surface facing the open top end of the adapter receptacle for mounting thereon the base of the mounting member supporting the portable electronic device.

1 Claim, 7 Drawing Sheets

CUP HOLDER ADAPTER FOR MOUNTING PORTABLE ELECTRONIC DEVICES IN A VEHICLE CONSOLE

CROSS REFERENCE TO RELATED APPLICATION

This application claims priority of U.S. Provisional Application Ser. No. 60/965,106, filed Aug. 17, 2007, the pendency of which is extended until Aug. 18, 2008 under 35 U.S.C. 119(e)(3).

BACKGROUND OF THE INVENTION

1. Field of the Invention

This invention relates generally to the field of mounting assemblies for electronic devices, and more particularly to a cup holder adapter for mounting portable electronic devices equipped with a windshield or dashboard mounting base in a conventional cup holder of a vehicle.

2. Background Art

The use of portable electronic devices in vehicles has increased dramatically in recent years, for example, electronic navigation devices, global positioning satellite (GPS) devices, cell phones, digital MP3 and video players, radios, personal digital assistants (PDAs), and pocket PCs. Such portable electronic devices are advantageous in that they can be taken from the vehicle and used outside of the vehicle. Most of these devices have displays that visibly communicate information to a driver or one or more users.

Due to the wide variety of electronic devices that can be mounted within a vehicle, many different types of mounting apparatuses exist that secure an electronic device to a flat surface in a vehicle, such as on the windshield or dashboard, and allow a user to adjustably position of the device for optimal viewing. Typically, the mounting apparatus used with portable electronic devices include a base member that is attached to the windshield or dashboard and connected via an articulating arm having a ball and socket joint to a cradle that removably supports the device, or the ball and socket joint may be attached to the housing of the device.

The base member on conventional windshield mounting apparatus is a suction cup mechanism that releasably attaches to the interior surface of the windshield. In the case of dashboard mounted electronic devices, a flat plate or disk may be fixedly or permanently secured to a surface of the vehicle by an adhesive and the suction cup mechanism of the base is then releasably attached to the surface of the plate or disk. The ball and socket joint allows the device to be selectively positioned in any of a broad range of positions relative to the base, and the suction cup allows quick and easy removal.

While these types of prior art windshield and dashboard mounting arrangements allow the electronic device to be adjustably positioned to provide maximum viewing capability to the user or users, they suffer from several drawbacks. For example, mounting such a device on the windshield can obscure the driver's view and present a safety hazard. In fact some States, for example California and Minnesota, have laws that prohibit drivers from using suction mounts on their windshields while operating motor vehicles.

Another drawback of windshield and dashboard mounting arrangements is that typically the portable electronic device is provided with a relatively long power cord that is plugged into the cigarette lighter or electrical accessory receptacle of the vehicle to power or recharge the device. The cigarette lighter or electrical accessory receptacle is usually located in the dashboard or on the console of the vehicle, and the excess length of the cord can become entangled with knobs or other projections on the dashboard, or may loop down closely adjacent to the driver's feet.

Although windshield and dashboard mounting arrangements allow viewing of the display screen, some portable electronic devices may require entry of data via data entry buttons on the device, which are not always easily accessible from the driver's seat, which can also present a hazard. Still another problem with some windshield and dashboard mounting arrangements is that the electronic device is only viewable by the driver of the vehicle, but not a person sitting in the passenger seat. In the case of GPS and portable navigation devices, a passenger is often acting as a navigator. In such situations, it would be advantageous for the passenger to be able to view and/or enter data via the data entry buttons on the device.

There are several patents directed toward various apparatus for mounting portable electronic devices utilizing an existing cup holder.

Dotson et al, U.S. Pat. No. 6,019,325 discloses a portable depth-finder display support consisting of a cylindrical flexible bushing base, a tubular shaft and a mounting plate. The bushing base is formed of elastic material and sized to fit within the confines of a standard-sized cup holder such as those found molded into the deck structures of many recreational motor boats. One end of the tubular shaft is fitted into a centered hole in the bushing base. The mounting plate is fixed atop the other end of the tubular shaft and has a plurality of circular openings to accommodate manufacturer supplied depth-finder mounting brackets.

Etue, U.S. Pat. No. 6,062,518 discloses a cellular phone retainer utilizing an existing cup holder. The device includes a base with a top portion and one or more downwardly extending gripping members for gripping the side wall of the cup holder, and a bracket for retaining a cellular phone supported on the base. The device preferably includes an elongated extension extending upwardly from the top portion of the base and terminating in an adjustable connector that supports the retaining bracket. The downwardly extending gripping members preferably are laterally adjustable to allow the device to accommodate a variety of cup holders.

Wang, U.S. Pat. No. 6,267,340 discloses an inserted support comprising a base plate, two supporting blocks, a volute disk, and a facial plate engaged with each other by fastening screws. The supporting blocks are oppositely disposed and laterally adjustable by the volute disk to engage a hole in an article carrier in a car, such as a cup holder. The facial plate is provided fitting onto a base plate and a vertical support for supporting a mobile phone.

Walsh, U.S. Pat. No. 7,099,466 discloses a portable telephone or cell phone holder fits in a conventional cup holder of an automobile or other vehicle. The holder has an arcuate sidewall that is less than 360° and is resiliently deformable to be squeezed down to less than the diameter of the cup holder and then, when released, to grip the inside surface of the cup holder. A tongue extends upwardly and radially inwardly from the sidewall to a distal end to provide a support telephone platform and has a concave slanted surface to accommodate and center a telephone belt clip.

Seil et al, U.S. Pat. No. 7,140,586 discloses an apparatus capable of holding an object in cooperation with a cup holder of a vehicle comprising a base sized to fit within the cup holder of the vehicle, a vertical post threadedly engaged at a lower end to a column in the center of the base, and a support member coupled to the upper end of the posed that serves as a platform, a cradle, or other resting place or supporting surface for an object to be held. The support member may be provided with a suction cup for securing the object being held within the support. The post may be rotated to adjust the vertical distance between the base and support member and may be connected at its upper end to the support member by a pivot mechanism for adjusting the angle therebetween. The base member is a cup-shaped configuration having at least one vertical ridge in its circumference to provide a friction fit in the cup holder. An adapter cup sized to receive the base member may also be provided to increase the perimeter of the base member to accommodate larger cup holder sizes.

Heininger, U.S. Published Application 2002/0049081, published Apr. 25, 2002, discloses an integral one-piece electronic equipment holding device comprising a base portion configured to fit within a standard cup holder, and a device retainer portion configured to retain the electronic device. The first or lower end of the base portion is configured to be received and frictionally retained in a cup holder and the second or upper end portion is configured to hold a cellular phone or other electronic device. The second end has four substantially vertical walls, including a forward wall, rear wall, and two opposing lateral side walls. The forward wall may be much shorter than the other walls to serves as a lip to prevent the electronic device from sliding out. The rear wall has a slot to accommodate power cord. The lateral side walls contain retention tabs that provide an additional restraint for the device being held and also to allow the device holder to accept a wider variety of models of hand-held devices while providing a snug and secure fit. In an alternate embodiment, the forward wall is the same height as the other walls to form wall configuration modified to accept a soft, shock-absorbing insert that retains the electronic device.

Edwards, U.S. Published Application 2002/0094078, published Jul. 18, 2002, discloses a one-piece cellular phone receptacle comprising a cylindrically shaped structure having a rounded top that is constructed of a closed cell foam rubber material having a tactile surface and dimensioned to be contained within a standard automobile cup holder. The rounded top includes a groove, dimensioned to accept a cellular telephone. The tactile surface of the mounted receptacle cooperates with the cup holder surfaces to fix the receptacle in place.

Because the present invention can be placed in a cup holder, it is also related to the field of article holders utilizing a receptacle means. The art related to receptacle-type article holders is varied. For example, my previous design patent U.S. Des 439,116, which is hereby expressly incorporated herein by reference in its entirety, shows a universal holder/adaptor for beverage container receptacles.

Chandler, U.S. Pat. No. 5,088,673 discloses a cup adapter for holding an enlarged drinking container having an upper enlarged receptacle that is of a larger internal diameter for holding large diameter drinking containers with a lower pedestal of a smaller outer diameter adapted to fit the console socket of a vehicle.

Ney et al, U.S. Pat. No. 5,897,041 discloses an apparatus for supporting a beverage container within an existing generally cylindrical recess in a motor vehicle. The apparatus includes a generally cylindrical sidewall having an upper and lower portion, each defining a cylindrical recess for receiving varying sizes of beverage containers. A radial flange interconnects the upper and lower portions, and further provides a surface upon which to support a beverage container. Retaining devices extend from the radial flange and secure the apparatus in the existing recess in the motor vehicle. The apparatus further includes a slot to allow a mug handle to extend therethrough and a pressure relief aperture in its base.

Mitchell, U.S. Pat. No. 5,174,534 discloses an adapter for adapting a container holder to support a container, such as a beverage container, in a substantially upright position. The adapter includes a first adapter member, which is insertable into a receptacle in the container holder and a second adapter member, which is adapted for mating engagement with both the first adapter member and the container to support the container in a substantially upright position. The first adapter member is configured for snug fit mating engagement with the receptacle. The second adapter member includes a bottom portion configured for snug fit mating engagement with the first adapter member and a top portion configured for snug fit mating engagement with the container.

Additionally, Ruhnau, U.S. Pat. No. 5,676,340 discloses an adapter for holding over-sized containers for use in cylindrical beverage receptacles, such as cup holders, found in many vehicles. The adapter has an enlarged upper portion to receive an over-sized beverage container and an offset lower portion comprising an insertion base sized to fit within a standard-sized vehicle cup holder.

With regard to the cup holder adapters, it is apparent that the adapters are fashioned to compliment, but not expand upon, the original functionality of a cup holder. In other words, these adapters merely provide a means for mating over-sized or unusually shaped beverage containers with a standard-sized vehicle cup holder.

SUMMARY OF THE INVENTION

The present invention overcomes the aforementioned problems and is distinguished over the prior art, and these patents in particular, by a cup holder adapter for mounting portable electronic devices equipped with a windshield or dashboard mounting base in a conventional cup holder in a vehicle. The cup holder adapter apparatus includes a generally cup-shaped cup holder adapter receptacle that fits into an existing cup holder, and either or both of a flat disk or generally cylindrical height adapter member that is supported in the adapter receptacle and onto which the portable electronic device is to be mounted. The adapter receptacle has a side wall defining a generally truncated conical lower portion and a generally cylindrical upper portion of a larger diameter open at its top end. The exterior of the adapter receptacle has a series of increasingly larger diameters spaced vertically apart defining a series of exterior radial flanges and interior radial shoulders which allow the adapter receptacle to fit into existing conventional cup holders having a generally circular cavity such as in the console of the vehicle, or other types of cup holders such as the ring or semicircular loop type that pull out from the dashboard.

A generally rectangular slot extends vertically a distance downward from the open top end of the adapter receptacle to allow the user to insert one or more fingers therethrough. The cylindrical height adapter member is a hollow configuration having a generally cylindrical sidewall with an end wall at one end, an opposed open end, and a vertical slot extending from the open end to the end wall. The height adapter member is received inside of the upper portion of the adapter receptacle and is supported on one of the interior radial shoulders. The height adapter member may be supported inside of the upper portion of the adapter receptacle with either its end wall facing down supported on one of the interior radial shoulders to provide a lower mounting surface or with its open end supported on one of the interior radial shoulders and its end wall facing up to provide a higher mounting surface. Optionally, one or more flat circular disks may be provided that are received inside of the upper portion of the adapter receptacle, and supported on one of the interior radial shoulders to provide a mounting surface for mounting the portable electronic device.

The portable electronic device may be any portable electronic device, such as a GPS-based navigational device, supported on a conventional windshield or dashboard mounting apparatus having a base such as a suction cup or a flat plate or disk to be adhered by adhesive. The cup holder adapter receptacle is placed in the cup holder and the base of the mounting apparatus is secured by the suction cup or adhesive to the end wall of the height adapter or to a flat disk, which is supported inside the cup holder.

DESCRIPTION OF THE PREFERRED EMBODIMENT

Figure 1:
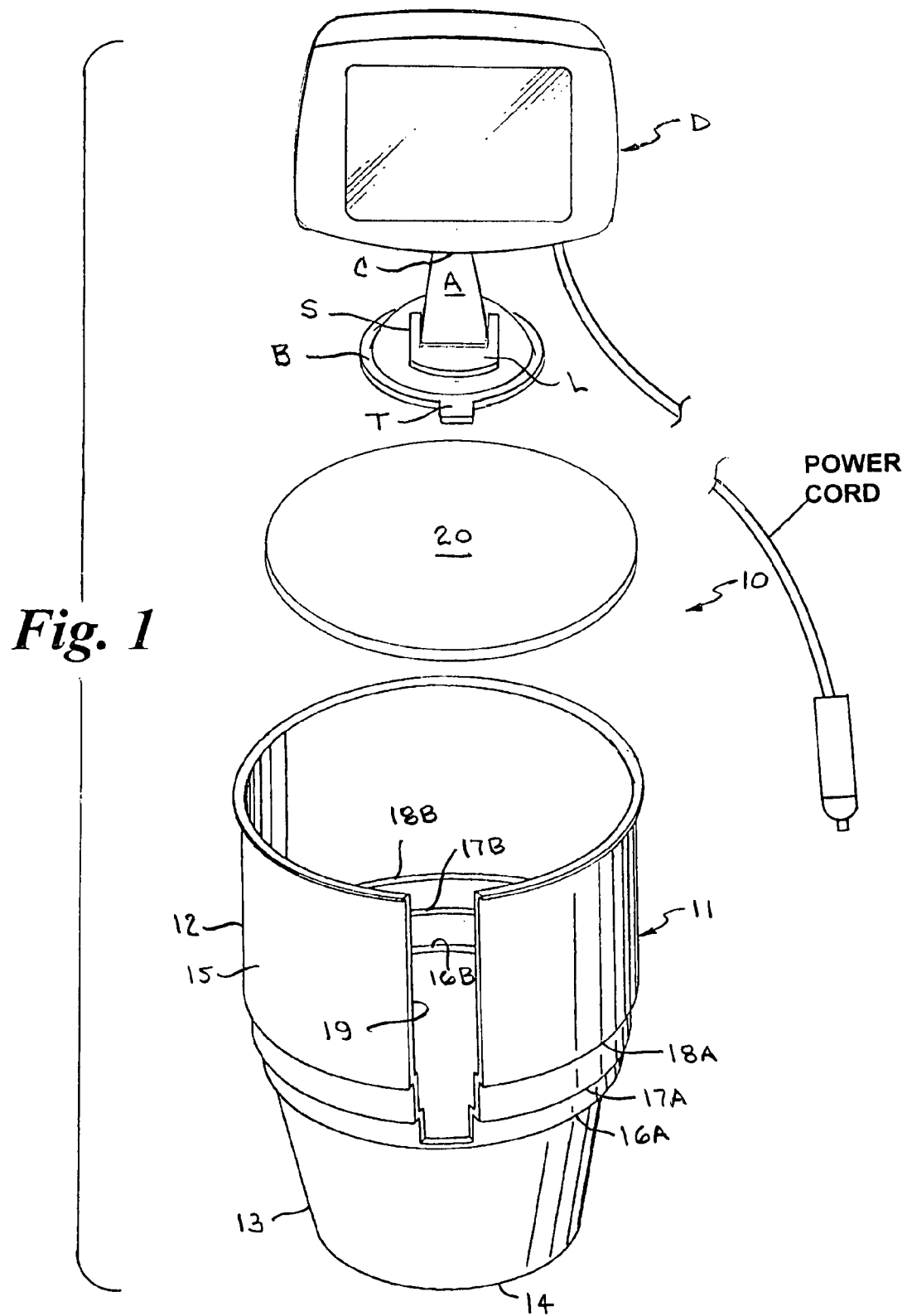
FIG. 1 is an exploded perspective view of the components of the cup holder adapter apparatus for mounting portable electronic devices in accordance with the present invention.

Referring to the drawings by numerals of reference, there is shown in FIG. 1, the components of the cup holder adapter apparatus for mounting portable electronic devices in accordance with the present invention. The apparatus 10 includes a generally cup-shaped cup holder adapter receptacle 11 that fits into an existing cup holder, and either or both of a flat disk 20 or generally cylindrical height adapter member 30 that is supported in the adapter receptacle and onto which the portable electronic device D is to be mounted.

Figure 4:
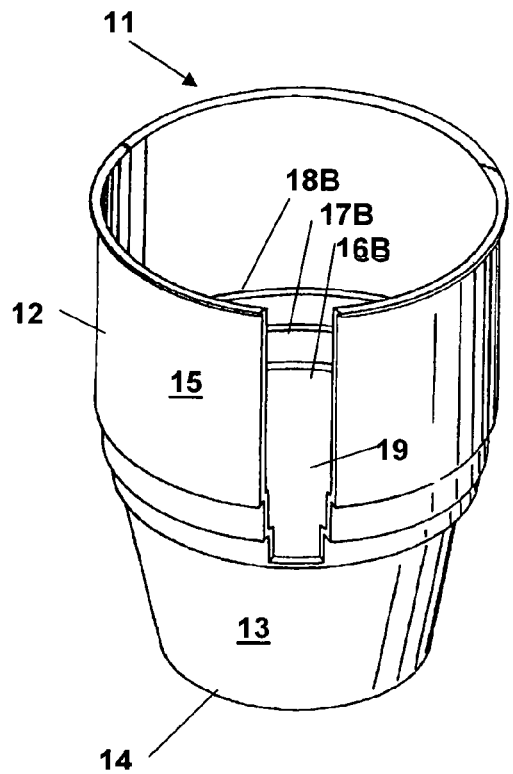
FIGS. 4 and 5 are isometric views of the cup holder adapter receptacle member shown from the top and bottom, respectively.
Figure 5:
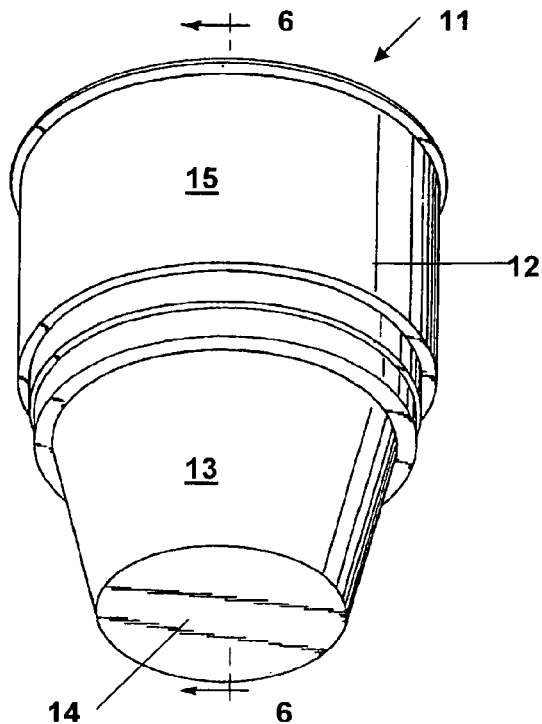
Figure 6:
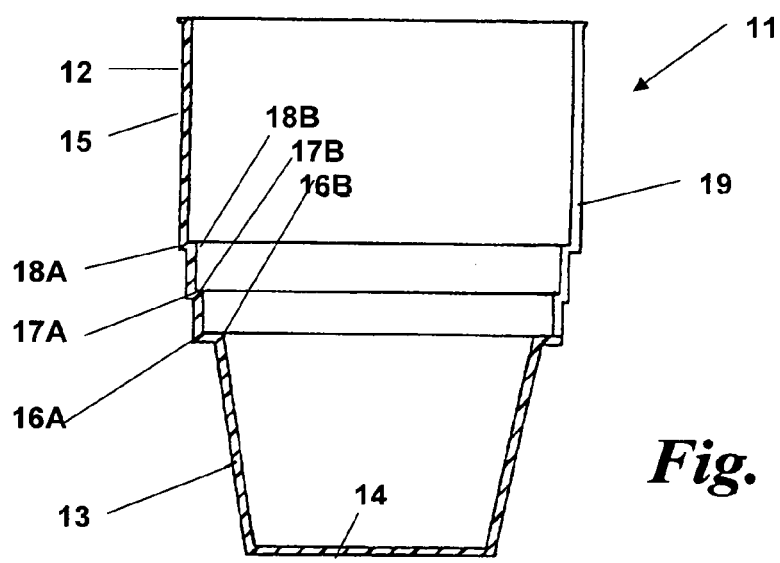
FIG. 6 is a longitudinal cross section of the cup holder adapter receptacle member, taken along line 6-6 of FIG. 5 showing the slot, the exterior flanges, and the interior shoulders.
Figure 7:
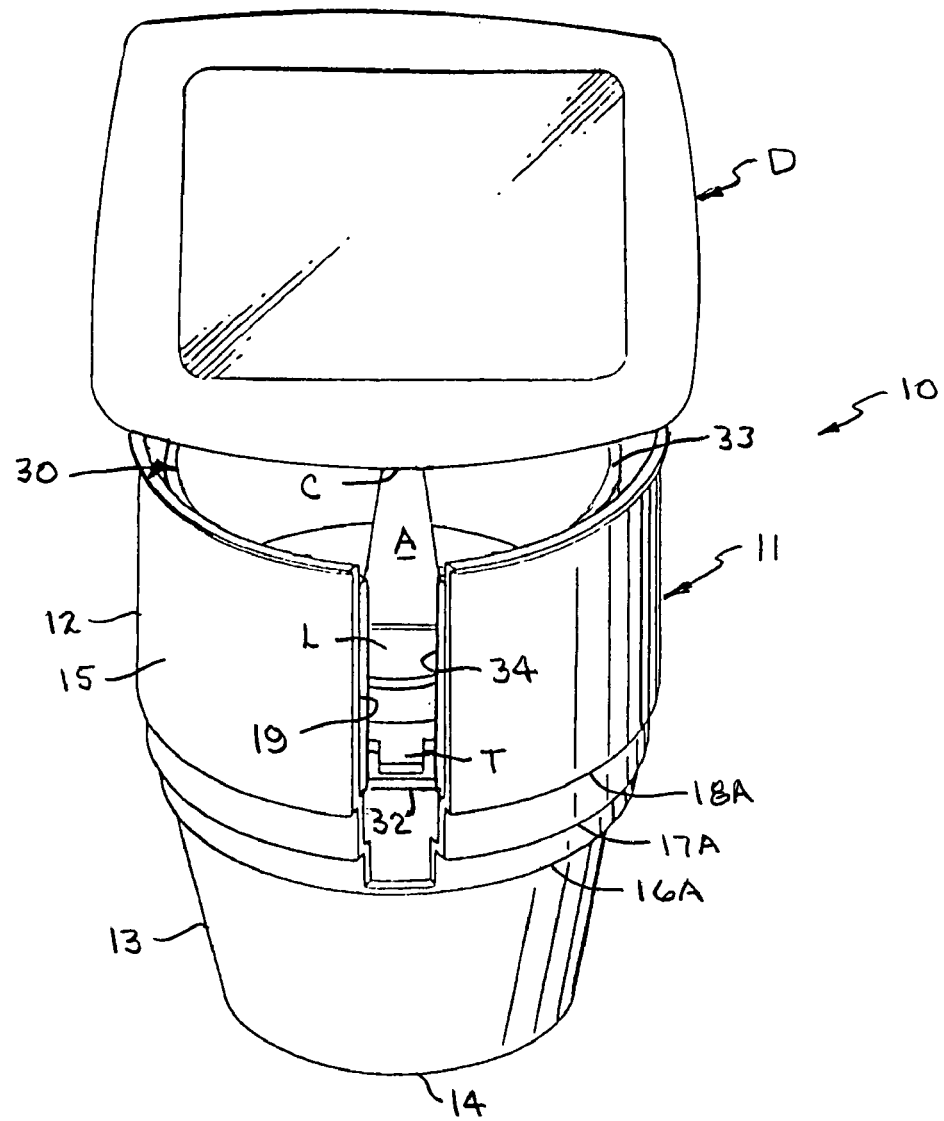
FIG. 7 is a perspective view showing a portable electronic device supported in a lower position in the adapter receptacle on a cylindrical height adapter member having its open end facing upward and the portable electronic device attached to the underside of the end wall of the height adapter member, as in FIG. 2.
Figure 8:
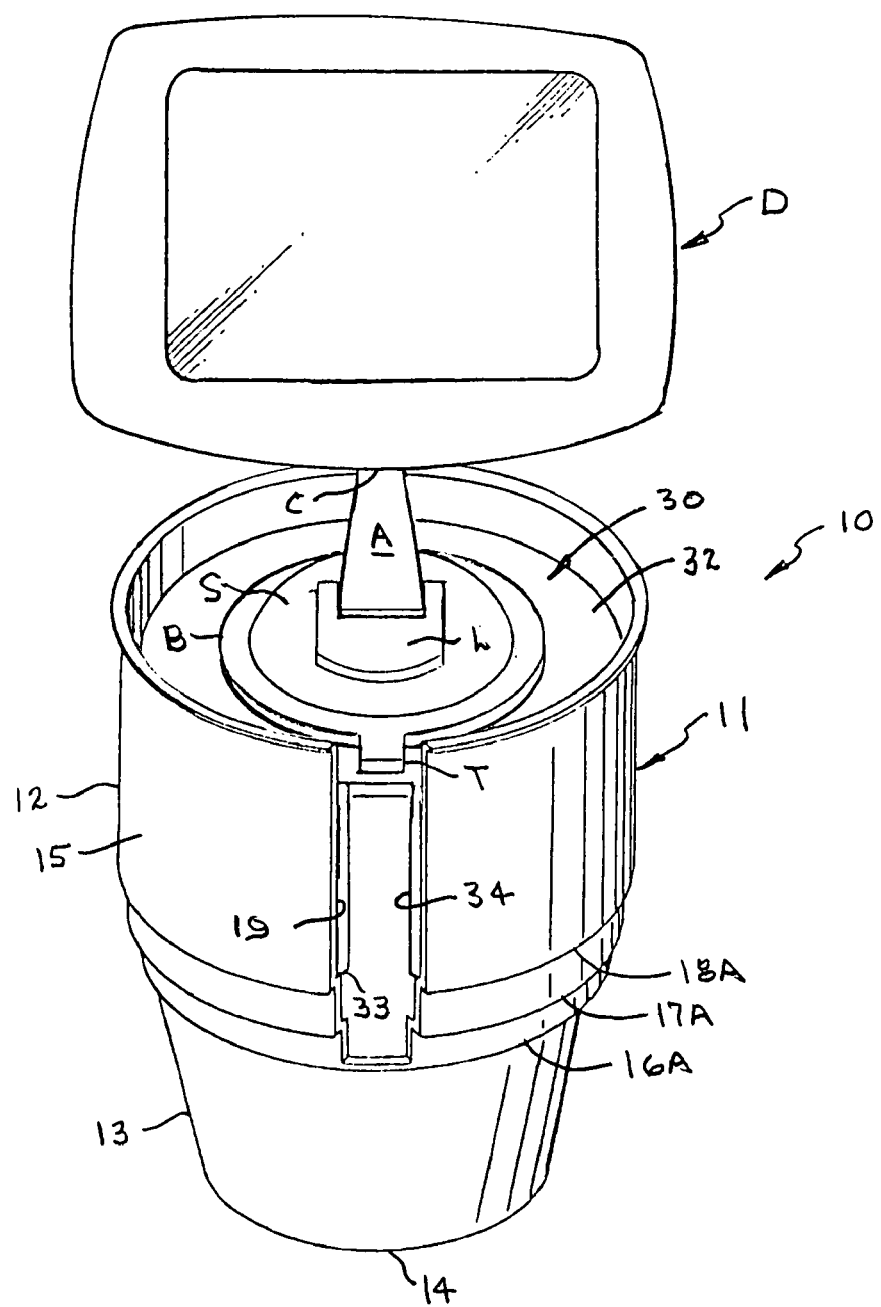
FIG. 8 is a perspective view showing a portable electronic device supported in an elevated position in the adapter receptacle on a cylindrical height adapter member having its end wall facing upward and the portable electronic device attached to the end wall of the height adapter member, as in FIG. 3.
Figure 9:
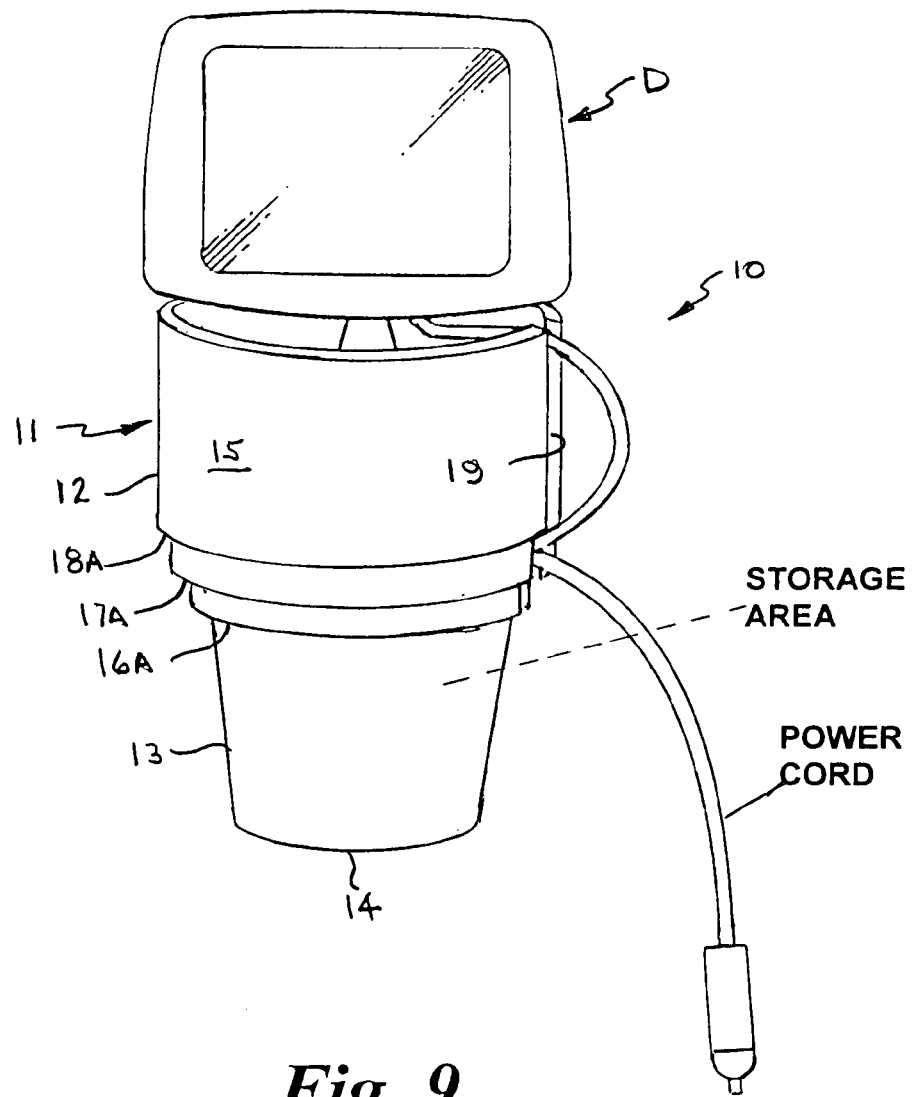
FIG. 9 is a perspective view showing a portable electronic device supported in the lower position in the adapter receptacle and the excess portion of the power cord stored in the lower portion of the adapter receptacle.

As best seen in FIGS. 4-6, the cup holder adapter receptacle 11 has a side wall 12 defining a generally truncated conical lower portion 13 having a bottom wall 14 and a generally cylindrical upper portion 15 of a larger diameter open at its top end. The intersection between the lower portion 13 and the upper portion 15 defines a lowermost exterior radial flange 16A on the exterior of the adapter receptacle and a lowermost interior radial shoulder 16B on the interior. Although in a preferred embodiment, the side wall of the lower portion 13 is tapered inwardly and downwardly defining the generally conical configuration, it should be understood that the lower portion can also be cylindrical.

In the illustrated embodiment of the adapter receptacle 11, the upper portion 15 has a series of increasingly larger diameters spaced vertically apart a short distance above the lowermost exterior radial flange 16A and radial shoulder 16B defining additional radial flanges 17A, 18A and shoulders 17B, 18B on the exterior and interior, respectively. However, it should be understood that the adapter receptacle 11 may be provided with only one exterior radial flange 16A and interior radial shoulder 16B.

Typically, cup holders in the console of a vehicle are a generally cylindrical cavity defined by a circular bottom and a vertical or slightly outward-extending side wall. Other types of cup holders may be of the ring type that pull out from the dashboard and have a ring, arms, or loop instead of side walls and may or may not include a bottom surface. For the purpose of this invention, a cup holder is defined as any device capable of holding a cup, mug, or other beverage container.

The tapered configuration of the lower portion 13 of the adapter receptacle 11 allows the lower portion to fit within recessed cup holders while also being frictionally retained by contact with the side wall or provide a close fit within existing cup holders of various diameter, and the exterior radial flange 16A, or flanges 17A, 18A, facilitates supporting the adapter receptacle in existing ring-type cup holders of various diameter.

A generally rectangular slot 19 extends vertically downward from the open top end of the upper portion 15 of the adapter receptacle 11 and terminates at the lowermost exterior radial flange 16A and interior radial shoulder 16B. The width of the slot 19 is of sufficient size so as to allow the user to insert one or more fingers therethrough to manipulate a suction cup lever, as described hereinafter.

Figure 2:
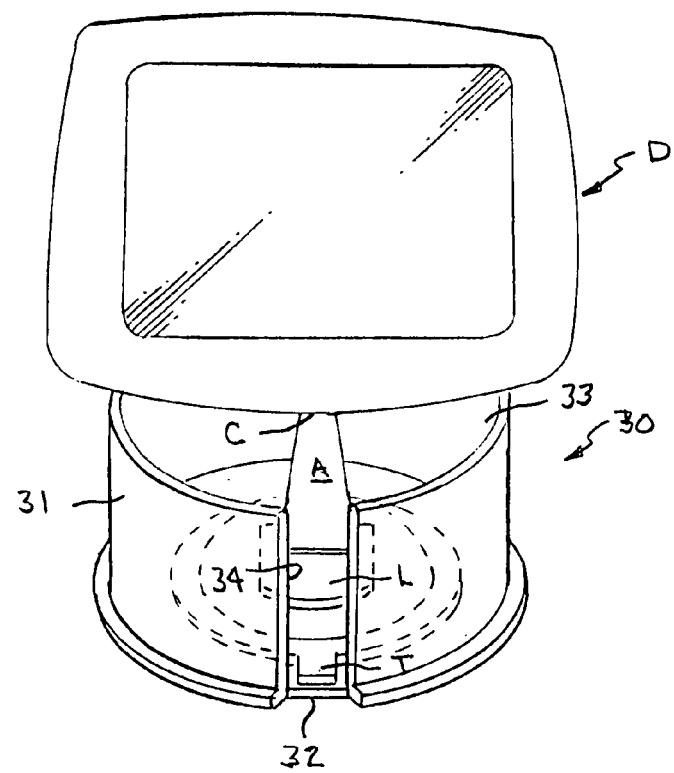
FIG. 2 is a perspective view of a cylindrical height adapter member of the cup holder adapter apparatus shown with its open end facing upward and a portable electronic device attached to the underside of the end wall of the height adapter member.
Figure 3:
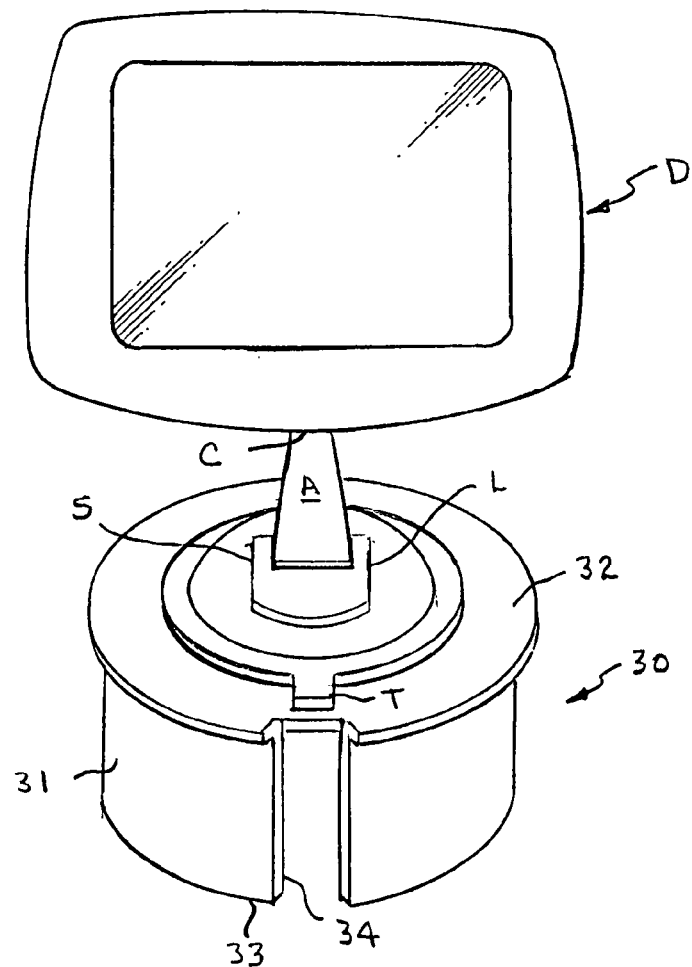
FIG. 3 is a perspective view of a cylindrical height adapter member of the cup holder adapter apparatus shown with its open end facing downward and a portable electronic device attached to the upward facing end wall of the height adapter member.

As seen in FIGS. 2 and 3, the generally cylindrical height adapter member 30 is a hollow cup-shaped configuration having a generally cylindrical sidewall 31 with an end wall 32 at one end and an opposed open end 33. A generally rectangular slot 34 extends vertically from the open end 33 of the height adapter 30 and terminates at the end wall 32. The width of the slot 34 is approximately the same width as the slot 19 in the adapter receptacle 11. The end wall 32 of the height adapter 30 serves as a mounting surface for mounting the portable electronic device D, as described below. The height adapter member 30 is received inside of the upper portion 15 of the adapter receptacle 11, and is supported on one of the interior radial shoulders 16B, 17B or 18B. The height adapter member 30 may be supported inside of the upper portion 15 of the adapter receptacle 11 with its end wall 32 facing down (FIG. 2) supported on one of the interior radial shoulders to provide a lower mounting surface, or may be inverted with its open end 33 facing down (FIG. 3) supported on one of the interior radial shoulders and its end wall 32 facing up to provide a higher mounting surface.

Optionally, one or more flat circular disks 20 (FIG. 1) may be provided that are/is sized to be received inside of the upper portion 15 of the adapter receptacle 11, and supported on one of the interior radial shoulders 16B, 17B or 18B to provide a mounting surface for mounting the portable electronic device D, as described below.

The portable electronic device D may be any portable electronic device to be removably mounted in a vehicle. For purposes of example only, and not limited thereto, the illustrated device D is a GPS-based navigational device, and has a conventional mounting apparatus of the type that has a cradle C that removably supports the device and which is connected via a ball and socket joint or an articulating arm linkage A to a base member B that is usually attached a flat surface in a vehicle, such as on the windshield or dashboard.

The base member B of a conventional windshield mounting apparatus is a suction cup mechanism S that releasably attaches to the interior surface of the windshield. In the case of dashboard mounted electronic devices, a flat plate or disk is typically adhered or permanently secured to a surface of the vehicle by an adhesive and the suction cup mechanism S of the base B is then releasably attached to the surface of the plate or disk. The ball and socket joint or articulated arm A allows the device to be selectively positioned in any of a broad range of positions relative to the base B, and the suction cup S allows quick and easy removal.

The conventional base B of a suction cup mount is typically a rigid circular base that is generally convex so as to curve away from the mounting surface with a flexible sheet positioned between the base and the mounting surface for engaging the mounting surface with a vacuum grip, wherein an air-tight seal is created between the flexible sheet and the mounting surface. A lever L positioned on the base and connected to the center of the flexible sheet enables the user to actuate the flexible sheet to create the vacuum gripping function. A tab T of the flexible sheet extends beyond a rim of the base and enables a user to release the base by breaking the air-tight seal between the flexible sheet and the mounting surface.

The base member B of a conventional dashboard type mounting apparatus typically has a rigid circular flat bottom surface that is usually adhered to the windshield or other flat surface with adhesives, or a peel-and-stick adhesive tape.

The components of the mounting apparatus, cradle, ball and socket joint or articulating arm linkage, base member and suction cup mechanism are conventional in the art and therefore represented somewhat schematically and not shown or described in greater detail.

Operation

To use the present cup holder adapter, the base portable electronic device D is attached to the cradle member, or to the ball and socket joint, of the articulating arm linkage of the conventional windshield or dashboard mounting apparatus.

The base member B at the other end of the ball and socket joint or articulating arm linkage A is then attached to the end wall 32 of the height adapter member 30. Optionally, the base B may be attached to the flat disk 20. The height adapter member 30 may be positioned with its end wall 32 facing upward whereby its top surface provides a higher mounting surface or with its end wall facing downward whereby the underside of the top wall provides a lower mounting surface.

If a suction cup type base B is being used, the suction cup S is attached to the top or underside of the end wall 32 of the height adapter 30 with the lever member L of the suction cup mechanism facing the slot 34 in the side wall of the height adapter.

The height adapter 30 is then placed inside the upper portion 15 of the adapter receptacle 11 with either its open bottom end 33 or its end wall 32 supported on one of the interior radial shoulders 16B, 17B or 18B of the adapter receptacle and the slot 34 in the side wall of the height adapter aligned with the slot 19 in the side wall of the receptacle 11, such that the display of the portable electronic device D is above the top rim of the adapter receptacle. If the flat disk is being used, it can be rotated to position the suction cup lever L facing the slot 19 in the side wall of the receptacle 11.

The adapter receptacle 11 is then placed into the existing cup holder. If a power cord is used with the portable electronic device, its jack may be plugged into the cigarette lighter or electrical accessory receptacle of the vehicle. The excess length of the cord can be wrapped up and placed in the adapter receptacle in the space beneath the height adapter or flat disk to prevent it from becoming entangled with knobs or other projections on the dashboard, or looping down closely adjacent to the driver's feet.

The user may insert one or more fingers through slot 19 in the adapter receptacle or aligned slots 19 and 34 in the receptacle 11 and height adapter 30 to manipulate a suction cup lever L to install or remove the mounting arm assembly and/or the tab T of the flexible sheet that extends beyond the suction cup base to release the vacuum grip on the mounting surface.

It should be understood that if the mounting arm A for the portable electronic device has a flat bottom surface, rather than a suction cup, it may be adhered to the to the top or underside of the end wall 32 of the height adapter 30, or to the flat disk 20 with adhesive, or a peel-and-stick adhesive tape.

While this invention has been described fully and completely with special emphasis upon a preferred embodiment, it should be understood that within the scope of the appended claims the invention may be practiced otherwise than as specifically described herein.

The invention claimed is:

1. A cup holder adapter apparatus for mounting a portable electronic device supported by a mounting member having a windshield or dashboard mounting base in a conventional cup holder in a vehicle, the cup holder adapter apparatus comprising:
- a generally cylindrical cup-shaped cup holder adapter receptacle having a bottom end wall, an open top end and a side wall defining a generally cylindrical upper portion and a generally conical truncated lower portion tapered inwardly and downwardly terminating at said bottom end wall, said lower portion sized and shaped to be removably received in an existing cup holder in the vehicle, and a generally rectangular slot in said upper portion extending vertically a distance downward from said open top end sized to allow a user to insert one or more fingers therethrough;
- at least one circumferential exterior radial flange on said cup holder adapter receptacle side wall and at least one interior radial shoulder in the interior of said adapter receptacle disposed between said upper portion and said lower portion; and
- a height adapter support member having a generally cylindrical sidewall with a flat end wall at one end defining a mounting surface, an opposed open end, and a vertical slot extending from said open end to said flat end wall sized to allow a user to insert one or more fingers therethrough, said height adapter support member removably supported in said adapter receptacle upper portion in either of a first position or an inverted second position with said mounting surface facing said adapter receptacle open top end for mounting thereto the base of the mounting member supporting the portable electronic device;
- in said first position, said height adapter support member open end facing up and its said flat end wall facing down supported on said at least one interior radial shoulder such that its said flat end wall provides a lower mounting surface with respect to said open top end of said adapter receptacle, and in said second inverted position said support member open end facing down supported on said at least one interior radial shoulder and its said flat end wall facing up to provide a higher mounting surface with respect to said open top end of said adapter receptacle; and said height adapter support member supported on said at least one interior radial shoulder enclosing said adapter receptacle open top end defining an interior storage compartment in said adapter receptacle for storing at least a portion of a power cord for the portable electronic device.

\* \* \* \* \*